United States Patent
Maeda et al.

(10) Patent No.: US 8,131,426 B2
(45) Date of Patent: Mar. 6, 2012

(54) VEHICLE STEERING SYSTEM

(75) Inventors: Shingo Maeda, Kashiwara (JP);
Masami Naka, Yamatokoriyama (JP);
Ryouhei Hayama, Nabari (JP); Kenji Higashi, Tenri (JP)

(73) Assignee: JTEKT Corporation, Osaka (JP)

( * ) Notice: Subject to any disclaimer, the term of this patent is extended or adjusted under 35 U.S.C. 154(b) by 471 days.

(21) Appl. No.: 12/521,578

(22) PCT Filed: Dec. 20, 2007

(86) PCT No.: PCT/JP2007/074566
§ 371 (c)(1),
(2), (4) Date: Jun. 28, 2009

(87) PCT Pub. No.: WO2008/084649
PCT Pub. Date: Jul. 17, 2008

(65) Prior Publication Data
US 2010/0318264 A1    Dec. 16, 2010

(30) Foreign Application Priority Data

Dec. 28, 2006  (JP) .................. 2006-356514

(51) Int. Cl.
*B62D 6/00* (2006.01)
*B62D 5/00* (2006.01)

(52) U.S. Cl. .......... 701/41; 701/43; 180/6.24; 180/443; 180/444

(58) Field of Classification Search ............. 701/41, 701/42, 43, 44; 180/6.2, 6.24, 6.44, 402, 180/405, 407, 443, 444, 447; 73/117.02; 280/5.51; 74/388 R, 388 PS, 484 R
See application file for complete search history.

(56) References Cited

U.S. PATENT DOCUMENTS

| | | | | |
|---|---|---|---|---|
| 6,580,989 B1 * | 6/2003 | Husain et al. | .................. | 701/41 |
| 6,842,678 B2 * | 1/2005 | Husain et al. | .................. | 701/41 |
| 6,929,086 B1 * | 8/2005 | Husain et al. | ................. | 180/413 |
| 7,664,584 B2 * | 2/2010 | Chino et al. | .................... | 701/41 |
| 2004/0039508 A1 | 2/2004 | Husain et al. | | |
| 2004/0262073 A1 * | 12/2004 | Husain et al. | ................. | 180/443 |
| 2005/0045413 A1 * | 3/2005 | Shitamitsu et al. | ........... | 180/402 |
| 2005/0072621 A1 * | 4/2005 | Hara et al. | ..................... | 180/444 |
| 2005/0178606 A1 * | 8/2005 | Husain et al. | ................ | 180/408 |
| 2005/0279562 A1 * | 12/2005 | Hara et al. | ..................... | 180/402 |
| 2006/0200289 A1 | 9/2006 | Chino et al. | | |
| 2006/0200290 A1 * | 9/2006 | Chino et al. | .................... | 701/41 |
| 2006/0289227 A1 * | 12/2006 | Chino et al. | ................ | 180/402 |
| 2007/0151795 A1 * | 7/2007 | Chino et al. | ................ | 180/444 |

FOREIGN PATENT DOCUMENTS

| | | |
|---|---|---|
| EP | 1698539 A1 | 9/2006 |
| JP | 2002-225733 | 8/2002 |
| JP | 2004-034751 | 2/2004 |
| JP | 2004-075051 | 3/2004 |
| JP | 2004-090782 | 3/2004 |
| JP | 2006-256453 | 9/2006 |

* cited by examiner

*Primary Examiner* — Thomas Black
*Assistant Examiner* — Ce Li
(74) *Attorney, Agent, or Firm* — Rabin & Berdo, P.C.

(57) ABSTRACT

A control section (10) of a vehicle steering system has a steer-by-wire mode, a power steering mode, and a transition mode. In the steer-by-wire mode, a steering actuator (19) is controlled for steering and a reaction force actuator (11) is controlled for reaction force. In the power steering mode, steering assistance control is performed with either of the steering actuator (19) and the reaction force actuator (11) caused to function as an assistance unit. In the transition mode, in a transition period from either of the steer-by-wire mode and the power steering mode to the other, the reaction force actuator (11) is controlled for reaction force.

6 Claims, 8 Drawing Sheets

VEHICLE STEERING SYSTEM

TECHNICAL FIELD

The present invention relates to vehicle steering systems used for motor vehicles such as automobiles.

BACKGROUND ART

Vehicle steering systems of a so-called steer-by-wire type in which steering members and steering mechanisms are not mechanically connected to each other have been known as vehicle steering systems such as automobiles.

Japanese Unexamined Patent Publication No. 2002-225733, for example, discloses a steer-by-wire type vehicle steering system including a transmitting mechanism arranged between a steering member and a steering mechanism and a clutch capable of mechanically connecting the steering member and the steering mechanism through the transmitting mechanism. In the vehicle steering system, the steering member and the steering mechanism are mechanically connected to each other when an abnormality occurs in the steering mechanism, for example.

DISCLOSURE OF THE INVENTION

Problems to be Solved by the Invention

In the above-mentioned steer-by-wire type vehicle steering system, a reaction force from a road surface is steeply applied to the steering member when the steering member and the steering mechanism are connected to each other, a great variation TW may, in some cases, occur in a steering reaction force bodily felt through the steering member by a driver. That is, the steering reaction force is lowered once and then rapidly raised with the actual completion of the connection by the clutch, to settle at a proper value through overshoot.

Means for Solving the Problems

Against such a background, the present invention is directed to providing a vehicle steering system in which no discomfort is created in a steering feeling before and after switching between connection of a steering member and a steering mechanism and release of the connection.

In order to attain the above-mentioned object, in a preferred aspect of the present invention, a vehicle steering system includes a first rotating member connected to a steering member, a second rotating member connected to a steering mechanism, a switching member for switching between a connected state where the first rotating member and the second rotating member are connected to each other and a connection released state where the connection between the first rotating member and the second rotating member is released, a reaction force actuator for applying a steering reaction force to the steering member, a steering actuator for driving the steering mechanism in the connection released state, and a control section for controlling the steering actuator, the reaction force actuator, and the switching member. The control section includes a steer-by-wire mode, a power steering mode, and a first transition mode for transition from the steer-by-wire mode to the power steering mode. In the steer-by-wire mode, the control section controls the steering actuator for steering while controlling the reaction force actuator for reaction force in the connection released state. In the power steering mode, steering assistance control is carried out with at least one of the steering actuator and the reaction force actuator as an assist unit in the connected state. In the first transition mode, the control section controls the reaction force actuator for reaction force in a transition period from the steer-by-wire mode to the power steering mode. In the first transition mode, the reaction force actuator is controlled such that a reaction force generated by the reaction force actuator is gradually increased toward a target reaction force at the completion of the switching previously set or is held in a reaction force generated by the reaction force actuator before output of a switching signal.

According to the aspect, in the transition period from the steer-by-wire mode to the power steering mode, that is, in a transition period in the case of switching from the connection released state where the connection between the first and second rotating members is released to the connected state where the first and second rotating members are connected to each other, the reaction force actuator is controlled for reaction force. This causes the reaction force generated by the reaction force actuator to be adjusted in the transition period, thereby allowing a rapid variation in the steering reaction force before and after the switching to be reduced. As a result, no discomfort is created in a steering feeling of a driver before and after the switching.

In order to eliminate the discomfort in the steering feeling by the transition, in the first transition mode, the reaction force actuator is controlled such that the reaction force generated by the reaction force actuator is gradually brought closer to the target reaction force at the completion of the switching previously set or is held in the reaction force generated by the reaction force actuator before the output of the switching signal.

Furthermore, the first transition mode is preferably started in response to the output of the switching signal to the switching member.

BEST MODE FOR CARRYING OUT THE INVENTION

Embodiments of the present invention will be specifically described with reference to the drawings.

Figure 1:
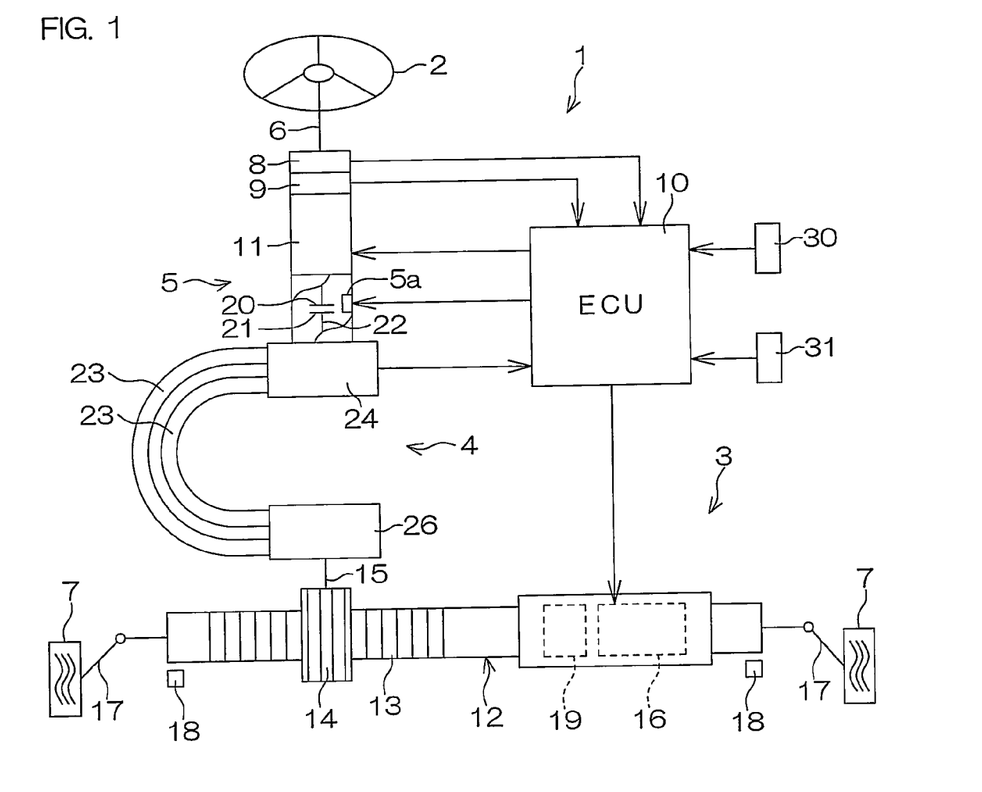
FIG. 1 is a schematic view showing the schematic configuration of a vehicle steering system according to an embodiment of the present invention.
Figure 2:
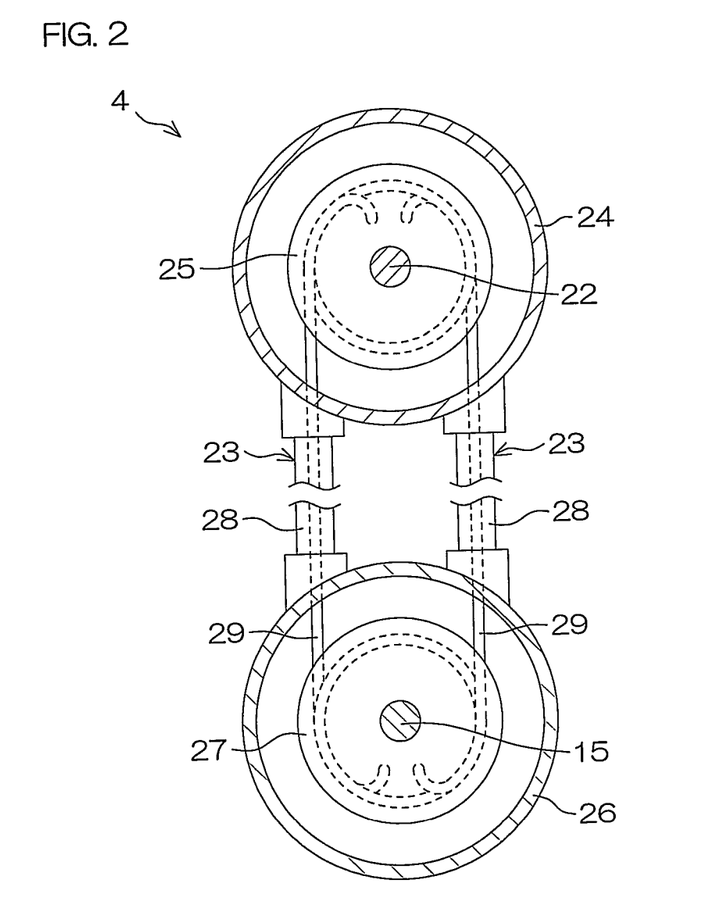
FIG. 2 is a schematic sectional view of a transmitting mechanism included in a vehicle steering system.

FIG. 1 is a schematic view showing the schematic configuration of a vehicle steering system 1 according to an embodiment of the present invention. FIG. 2 is a schematic sectional view of a transmitting mechanism 4 included in the vehicle steering system 1.

Referring to FIG. 1, the vehicle steering system 1 according to the present embodiment is capable of switching between a steer-by-wire mode and a power steering mode. The vehicle steering system 1 includes a steering wheel 2 serving as a steering member, a rack-and-pinion mechanism 3 serving as a steering mechanism, and a transmitting mechanism 4 and a connecting member 5 for mechanically connecting the steering member and the steering mechanism.

The steering wheel 2 is connected to one end of a steering shaft 6 so as to be integrally rotatable. The steering wheel 2 is steered (rotated) so that steerable wheels 7 are steered. The steering angle and the steering torque of the steering wheel 2 are respectively detected by a steering angle sensor 8 and a torque sensor 9 that are provided around the steering shaft 6. Furthermore, detection signals from the steering angle sensor 8 and the torque sensor 9 are inputted to an ECU (Electronic Control Unit) 10.

The steering shaft 6 is rotatably supported on a housing (not shown) fixed to a vehicle body. Furthermore, a reaction force motor 11 serving as a reaction force actuator for applying a steering reaction force (a torque in the opposite direction to the steering direction) to the steering wheel 2 is coaxially connected to a middle portion of the steering shaft 6.

The rack-and-pinion mechanism 3 includes a rack shaft 12 serving as a steerable shaft extending in a right-and-left direction of a motor vehicle, a pinion shaft 15 having a pinion 14, which is meshed with a rack 13 formed in the rack shaft 12, formed at its one end, and a steering motor 16 serving as a steering actuator coaxially connected to the rack shaft 12 for applying a steering force to the rack shaft 12.

The rack shaft 12 is supported so as to be axially movable within the housing (not shown) fixed to the vehicle body. Tie rods 17 are respectively coupled to both ends of the rack shaft 12. The steerable wheel 7 is connected to each of the tie rods 17 through a knuckle arm (not shown). The steering amount of the steerable wheel 7 is detected by a pair of stroke sensors 18 serving as steered state detecting sensors. That is, the steering amount of the steerable wheel 7 is detected from the axial movement amount of the rack shaft 12 detected by the pair of stroke sensors 18. A detection signal from each of the stroke sensors 18 is inputted to the ECU 10. Furthermore, a detection signal from a vehicle speed sensor 30 for detecting the vehicle speed and a detection signal from a yaw rate sensor 31 for detecting the yaw rate of the motor vehicle are inputted to the ECU 10.

A converting mechanism 19 converts the rotation of the rotation axis of the steering motor 16 serving as a steering actuator into the axial movement of the rack shaft 12. Examples of the converting mechanism include a ball screw mechanism.

The connecting member 5 includes a first member 20 and a second member 21 that are opposed to each other. The first member 20 is connected to the other end of the steering shaft 6 (an end opposite to an end to which the steering wheel 2 is connected) so as to be integrally rotatable. The second member 21 is connected to a rotating shaft 22, which is synchronized with the transmitting mechanism 4, so as to be integrally rotatable. The first member 20 and the second member 21 are connected to each other upon control by the ECU 10 so that the steering shaft 6 and the rotating shaft 22 are connected to each other so as to be integrally rotatable. Examples of the connecting member 5 include an electromagnetic clutch, a friction clutch, and a meshing clutch.

There is provided an actuator 5a for switching between a connected state and a connection released state by the connecting member 5. When the electromagnetic clutch is used as the connecting member 5, a solenoid for switching between a connected state and a connection released state of the electromagnetic clutch is used as the actuator 5a. The actuator 5a functions as a switching member for switching between a connected state where the steering shaft 6 serving as a first rotating member and the pinion shaft 15 serving as a second rotating member are connected to each other and a connection released state where the connection is released.

The ECU 10 outputs a switching signal to the actuator 5a serving as a switching member. Specifically, the switching signal is a connection signal for achieving the connected state of the steering shaft 6 and the pinion shaft 15 and a connection release signal for achieving the connection released state of the steering shaft 6 and the pinion shaft 15. Furthermore, the ECU 10 outputs a signal for driving the reaction force motor 11 serving as a reaction force actuator and the steering motor 19 serving as a steering actuator.

Referring to FIGS. 1 and 2, the transmitting mechanism 4 includes a pair of cables 23, a first pulley 25 rotatably held within a first casing 24, and a second pulley 27 rotatably held within a second casing 26.

Each of the cables 23 includes an outer tube 28 formed of a material having flexibility such as synthetic resin, for example, and an inner cable 29 composed of a metal wire, for example, movably inserted into the outer tube 28. One end of the outer tube 28 in each of the cables 23 is connected to the first casing 24, and the other end thereof is connected to the second casing 26. Furthermore, one end of the inner cable 29 in each of the cables 23 is connected to the first pulley 25, and the other end thereof is connected to the second pulley 27. The inner cables 29 in the cables 23 are respectively wound around the outer periphery of the first pulley 25 in opposite directions. Similarly, the inner cables 29 in the cables 23 are respectively wound around the outer periphery of the second pulley 27 in opposite directions.

The first pulley 25 is connected to the rotating shaft 22 so as to be integrally rotatable and coaxially. The first pulley 25 is rotatable in synchronization with the steering wheel 2 with the steering shaft 6 and the rotating shaft 22 connected to each other by the connecting member 5. Furthermore, the second pulley 27 is connected to the other end of the pinion shaft 15 so as to be integrally rotatable and coaxially.

When the steering wheel 2 is steered with the steering shaft 6 and the rotating shaft 22 connected to each other, the first pulley 25 rotates with the steering shaft 6 and the rotating shaft 22. At this time, one end of the one inner cable 29 is wound around the first pulley 25, and the other end thereof is wound off from the second pulley 27. This causes the rotation of the first pulley 25 to be transmitted to the second pulley 27 while causing the second pulley 27 to rotate with the pinion shaft 15. The rotation of the pinion shaft 15 is converted into the corresponding axial movement of the rack shaft 12 by the rack 13 and the pinion 14 so that the steerable wheels 7 are steered.

At this time, one end of the other inner cable 29 is wound off from the first pulley 25, and the other end thereof is wound around the second pulley 27.

Figure 3:
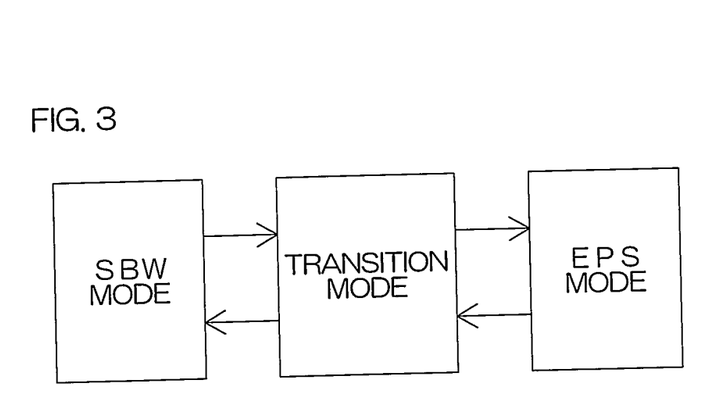
FIG. 3 is a diagram for explaining a control mode of a vehicle steering system.

FIG. 3 is a diagram for explaining a control mode of the vehicle steering system 1.

Referring to FIG. 3, the vehicle steering system 1 according to one embodiment of the present invention has three control modes. That is, the vehicle steering system 1 has the above-mentioned steer-by-wire mode (hereinafter referred to as an "SBW mode") in which the steerable wheels 7 are steered with the steering wheel 2 and the rack-and-pinion mechanism 3 not mechanically connected to each other, the above-mentioned power steering mode (hereinafter referred to as an "EPS mode") in which the steerable wheels 7 are steered with the steering wheel 2 and the rack-and-pinion mechanism 3 mechanically connected to each other, and a transition mode serving as a control mode in a transition period from either one of the SBW mode and the EPS mode to the other.

The three control modes will be described in detail below.

Figure 4:
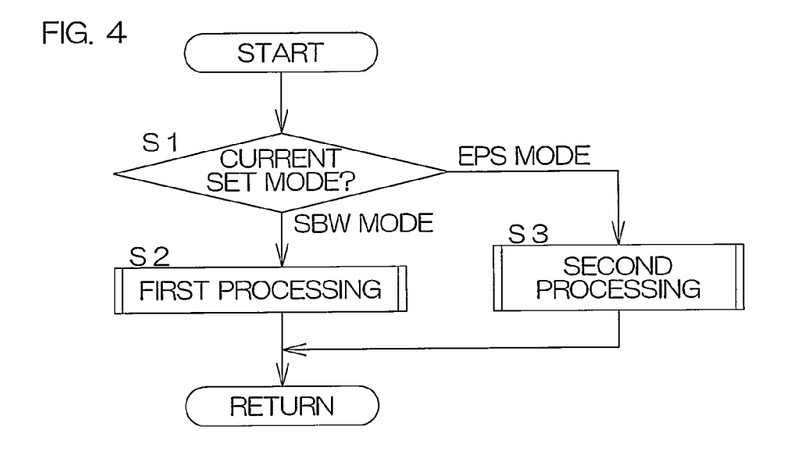
FIG. 4 is a flow chart showing the basic flow of control carried out by a control section.

FIG. 4 shows a control flow of the vehicle steering system 1. Referring to FIG. 4, a currently set mode is first determined in step S1.

When the SBW mode is set, the operation proceeds to step S2, where first processing is performed. On the other hand, when the EPS mode is set, the operation proceeds to step S3, where second processing is performed.

Figure 5:
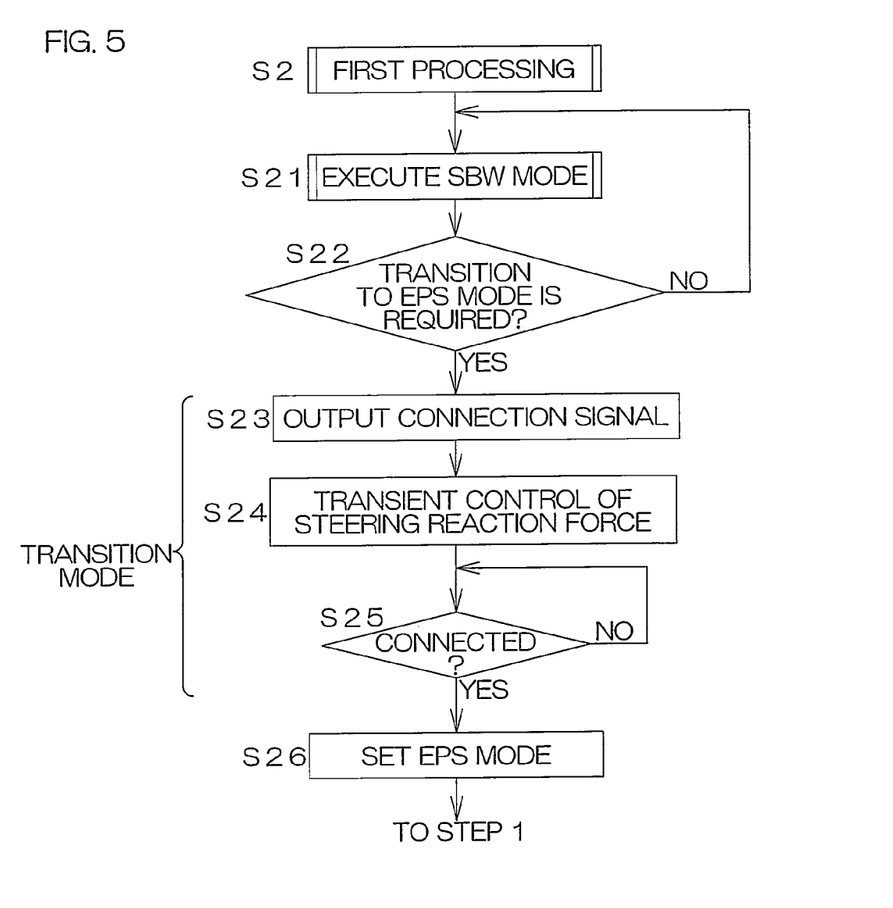
FIG. 5 is a control flow of a vehicle steering system including a transition mode in the case of transition from an SBW mode to an EPS mode.
Figure 6:
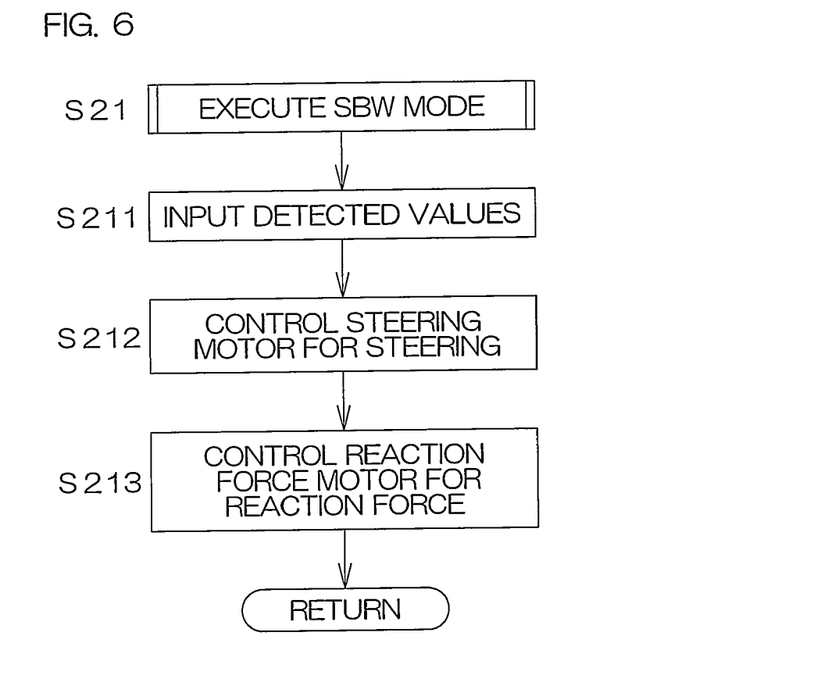
FIG. 6 is a control flow of a vehicle steering system in an SBW mode.
Figure 7:
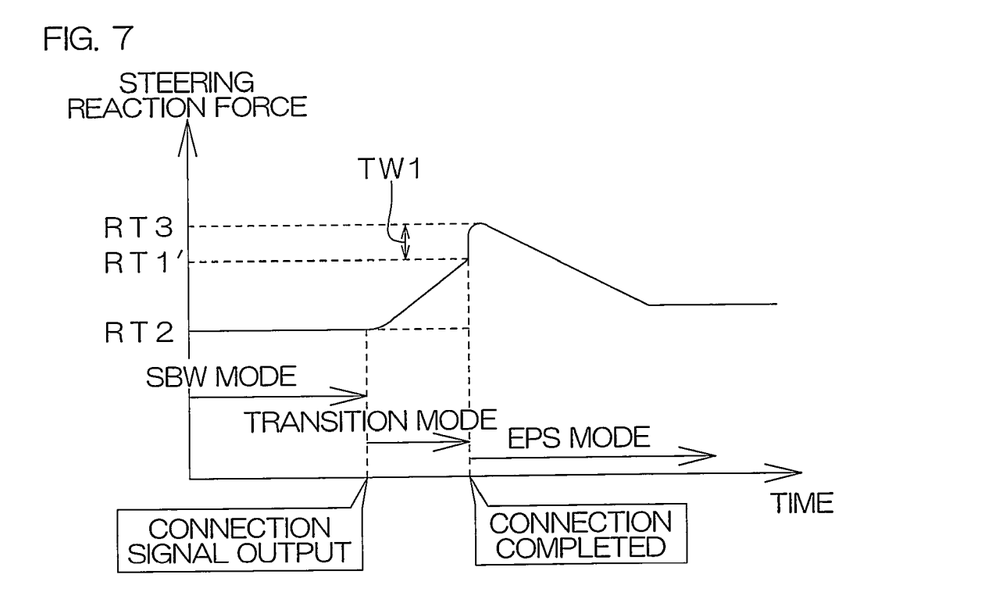
FIG. 7 is a graph showing the values of a steering reaction force in a transition mode and mode before and after the transition mode.

FIG. 5 is a flow chart related to the first processing. The flow chart of FIG. 5 includes a control flow of the vehicle steering system 1 in a first transition mode in the case of transition from the SBW mode to the EPS mode. FIG. 6 is a subroutine program in a case where the SBW mode is executed. FIG. 7 is a graph showing the values of a steering reaction force in the transition mode and the modes before and after the transition mode.

Referring to FIG. 5, in the first processing in the case where the SBW mode is set, the SBW mode is executed (step S21). The contents of the execution of the SBW mode are shown in FIG. 6. That is, referring to FIG. 1, the steering wheel 2 is steered in the SBW mode with the steering wheel 2 and the rack-and-pinion mechanism 3 not mechanically connected to each other. When the steering wheel 2 is steered, the steering angle and the steering torque of the steering wheel 2 are respectively detected by the steering angle sensor 8 and the torque sensor 9. At this time, the vehicle speed is detected by the vehicle speed sensor 30.

Detected values of the steering angle, the steering torque, and the vehicle speed are inputted 10 to the ECU 10 in step S211 shown in FIG. 6. The ECU controls the reaction force motor 11 and the steering motor 19 on the basis of the inputted detected values.

That is, the ECU 10 controls the steering motor 19 for steering on the basis of the steering angle and the like in step S212. Thus, a steering force is applied to the rack shaft 12, so that the rack shaft 12 moves in the corresponding axial direction. As a result, the steerable wheels 7 are steered with the steering wheel 2 and the rack-and-pinion mechanism 3 not mechanically connected to each other.

The ECU 10 controls the reaction force motor 11 for reaction force on the basis of the steering angle and the like in step S213. Thus, a steering reaction force is applied to the steering wheel 2 from the reaction force motor 11, so that the same steering feeling as a steering feeling in the EPS mode is given to a driver.

The ECU 10 then determines whether or not the transition to the EPS mode is required in step S22. When an abnormality occurs in the steering motor 16, the stroke sensor 18, or the like, for example, it is determined that the transition to the EPS mode is required (YES in step S22), a first transition mode in steps S23 to S25 is started.

On the other hand, when no abnormality occurs in the steering motor 16, the stroke sensor 18, or the like, for example, the ECU 10 determines that the transition to the EPS mode is not required (No in step S22), and the determination whether or not the transition to the EPS mode is required is repeated in a predetermined period.

In the first transition mode, a connection signal (a switching signal) for connection by the connecting member 5 is first outputted from the ECU 10 in step S23.

When the connection signal is outputted from the ECU 10 upon determination that the transition to the EPS mode is required (the first transition mode is started), the connection signal is inputted to the actuator 5a in the connecting member 5. On the other hand, the ECU 10 starts transient control of the steering reaction force in step S24 in response to the output of the connection signal.

That is, simultaneously with the output of the connection signal, the reaction force motor 11 is controlled such that the steering reaction force (the reaction force generated by the reaction force motor 11) gradually comes closer to a target steering reaction force RT1 at the completion of the connection (a reaction force received from a road surface) set from the values of the steering angle of the steering wheel 2, the steering angle of the steerable wheel 7, the vehicle speed, and so on at the time of the output of the connection signal, for example.

When the target steering reaction force RT1 at the completion of the connection expected from the values of the steering angle and the like is greater than a steering reaction force RT2 at the time of the output of the connection signal (RT1>RT2), for example, the ECU 10 increases the reaction force generated by the reaction force motor 11, to gradually bring the steering reaction force from the reaction force motor 11 closer to the target steering reaction force RT1. When the connection by the connecting member 5 is completed (YES in step S25), the steering reaction force from the reaction force motor 11 is a steering reaction force RT1' having a value approximated by the target steering reaction force RT1.

When the steering wheel 2 and the rack-and-pinion mechanism 3 are mechanically connected to each other upon completion of the connection by the connecting member 5, the first transition mode is completed. After the EPS mode is set in step S26, the operation then proceeds to step S1. When the EPS mode is executed in step S31 shown in FIG. 8, described later, steering assistance control of at least one of the reaction force motor 11 and the steering motor 10 is carried out, as shown in FIG. 9, described later.

That is, in the EPS mode in the present embodiment, at least one of the reaction force motor and the steering motor 10 functions as a steering assisting motor. For example, the ECU 10 instantaneously reverses the rotation direction of the reaction force motor 11, to apply a steering assist force to the steering wheel 2 from the reaction force motor 11.

Figure 14:
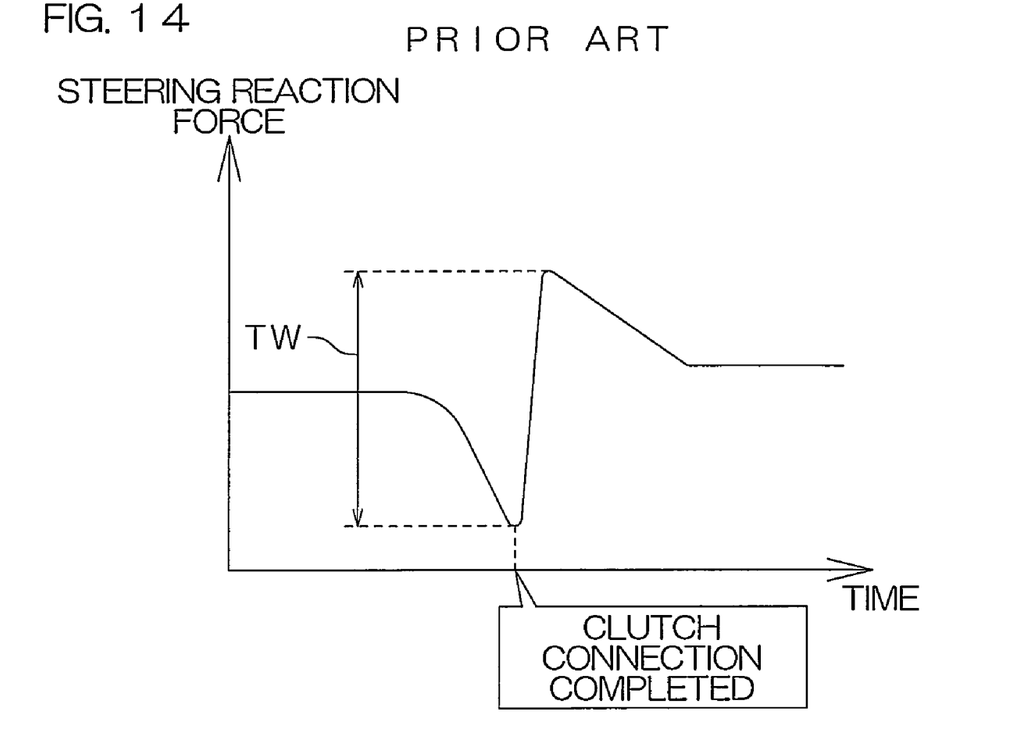
FIG. 14 is a diagram for explaining changes in a steering reaction force before and after connection of a steering member and a steering mechanism in a conventional vehicle steering system.

On the other hand, when the connection by the connecting member 5 is completed, the reaction force from the road surface is steeply inputted to the steering wheel 2 simultaneously with the completion of the connection, so that the steering reaction force varies (the value of the steering reaction force is RT3 in FIG. 7). In the conventional vehicle steering system, therefore, a steering reaction force bodily felt through the steering wheel 2 by the driver greatly varies (see FIG. 14).

In the vehicle steering system 1 according to the present embodiment, however, the reaction force motor 11 is controlled such that the reaction force generated from the reaction force motor 11 gradually comes closer to the target steering reaction force RT1 at the completion of the connection previously set in the first transition mode. Therefore, a torque variation width TW1 bodily felt actually by the driver is a difference between the steering reaction force received from the road surface at the completion of the connection and the steering reaction force received from the reaction force motor 11 at the completion of the connection (a difference between the steering reaction force RT3 and the steering reaction force RT1' in FIG. 7). This allows the driver to steer the steering wheel 2 without feeling discomfort in a steering feeling even before and after the connection by the connecting member 5.

Figure 8:
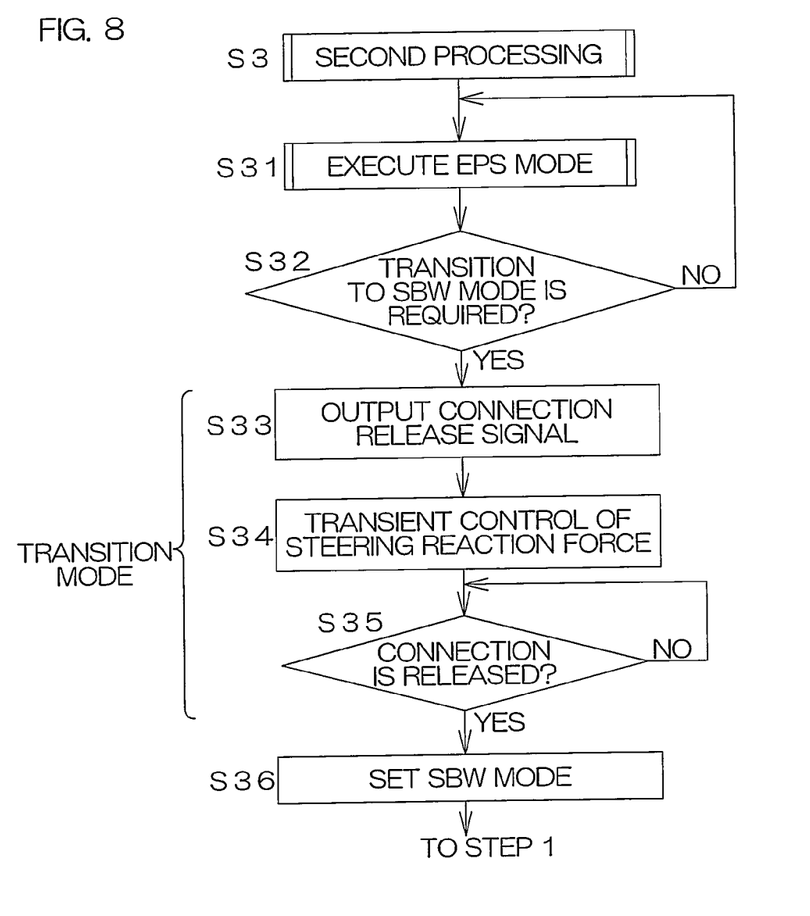
FIG. 8 is a control flow of a vehicle steering system including a transition mode in the case of transition from an EPS mode to an SBW mode.
Figure 9:
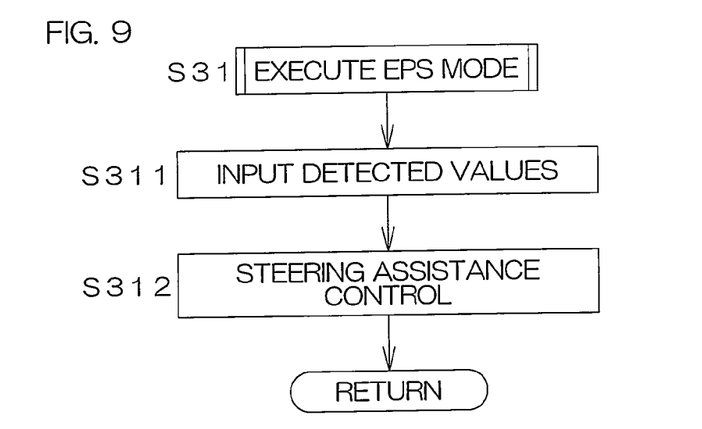
FIG. 9 is a control flow of a vehicle steering system in an EPS mode.
Figure 10:
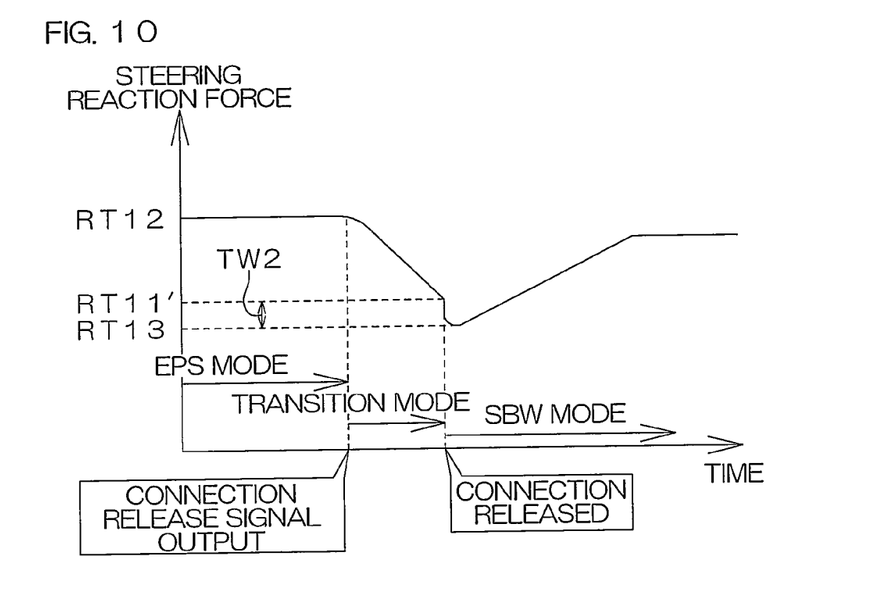
FIG. 10 is a graph showing the values of a steering reaction force in a transition mode and modes before and after the transition mode.

FIG. 8 is a flow chart related to the second processing. The flow chart of FIG. 8 includes a control flow of the vehicle steering system 1 in a second transition mode in the case of transition from the EPS mode to the SBW mode. FIG. 9 is a subroutine program in a case where the EPS mode is executed. FIG. 10 is a graph showing the values of a steering reaction force in the second transition mode and the modes before and after the second transition mode.

Referring to FIG. 8, in the second processing in the case where the EPS mode is set, the EPS mode is executed (step S31). The contents of the execution of the EPS mode are shown in FIG. 9. That is, referring to FIG. 1, the steering wheel 2 is stirred in the EPS mode with the steering wheel 2 and the rack-and-pinion mechanism 3 mechanically connected to each other by the steering shaft 6, the transmitting mechanism 4, the connecting member 5, and the pinion shaft 15.

When the steering wheel 2 is stirred, the steering angle, the steering torque, and the vehicle speed of the steering wheel 2 are respectively detected by the corresponding sensors 8, 9, and 30, as in the above-mentioned SBW mode, and their detected values are inputted to the ECU 10 in step S311 shown in FIG. 9.

The ECU 10 carries out steering assistance control with at least one of the reaction force motor 11 and the steering motor 19 as an assist unit on the basis of the inputted detected values (step S312). That is, at least one of the reaction force motor 11 and the steering motor 19 functions as a steering assisting motor, so that a driving force of at least one of the reaction force motor 11 and the steering motor 19 is applied to the steering wheel 2 as a steering assist force (a torque in the same direction as the steering direction).

This causes the steering assist force to be applied to the steering wheel 2, causing the steering by the driver to be assisted. That is, the steering assist force from the steering assisting motor is applied to the rack-and-pinion mechanism 3 in addition to the steering force from the driver, so that the steerable wheels 7 are steered. At this time, a reaction force from the road surface by steering the steerable wheels 7 is applied to the steering wheel 2 as a steering reaction force.

The ECU 10 then determines whether or not the transition to the SBW mode is required in step S32 shown in FIG. 8. Conditions for determining that the transition to the SBW mode is required are that a difference between a target yaw rate operated from the vehicle speed and the steering angle and an actual yaw rate detected by the yaw rate sensor 31 (see FIG. 1) exceeds a predetermined threshold value. When the above-mentioned conditions are satisfied, the posture of the motor vehicle must be stabilized. Therefore, the transition to the SBW mode is required.

When it is determined that the transition to the SBW mode is required (YES in step S32), a second transition mode in steps S33 to S35 is started.

On the other hand, when the ECU 10 determines that the transition to the SBW mode is not required (NO in step S32), the determination whether or not the transition to the SBW mode is required is repeated in a predetermined period.

In the second transition mode, a connection release signal (a switching signal) for releasing the connection by the connecting member 5 is first outputted from the ECU 10 in step S33.

When the connection release signal is outputted from the ECU 10 upon determination that the transition to the SBW mode is required (the second transition mode is started), the connection release signal is inputted to the actuator 5a in the connecting member 5. On the other hand, the ECU 10 starts transient control of the steering reaction force in step S34 in response to the output of the connection release signal.

That is, simultaneously with the output of the connection release signal, the reaction force motor 11 is controlled such that the steering reaction force (here, a difference between the reaction force received from the road surface and the steering assist force received from the reaction force motor 11) gradually comes closer to a target steering reaction force RT11 at the completion of the release of the connection (the reaction force generated from the reaction force motor 11) set from the values of the steering angle of the steering wheel 2, the steering angle of the steerable wheel 7, the vehicle speed, and so on at the time of the output of the connection release signal, for example.

When the target steering reaction force RT11 at the completion of the release of the connection set from the values of the steering angle and the like is smaller than a steering reaction force RT12 at the time of the output of the connection release signal (RT11<RT12), as shown in FIG. 10, for example, the ECU 10 reduces the steering assist force from the reaction force motor 11 to reduce the steering reaction force (the difference between the reaction force received from the road surface and the steering assist force received from the reaction force motor 11), to gradually bring the steering reaction force closer to the target steering reaction force RT11 at the completion of the release of the connection.

When the release of the connection by the connecting member 5 is completed (YES in step S35), the steering reaction force is a steering reaction force RT11' having a value approximated by the target steering reaction force RT11.

When the release of the connection by the connecting member 5 is completed, the second transition mode is completed. After the SBW mode is set in step S36, the operation then proceeds to step S1. When the SBW mode is executed in step S21 shown in FIG. 5, steering control of the steering motor 19 and reaction force control of the reaction force motor 11 are carried out, as shown in FIG. 6. That is, the ECU 10 instantaneously reverses the rotation direction of the reaction force motor 11, to apply a steering reaction force to the steering wheel 2 from the reaction force motor 11.

On the other hand, when the release of the connection by the connecting member 5 is completed, the reaction force from the road surface, which has been applied to the steering wheel 2, is steeply eliminated, so that the reaction force from the reaction force motor 11 is inputted to the steering wheel 2 (the value of the steering reaction force is RT13 in FIG. 10). In the conventional vehicle steering system, therefore, a steering reaction force bodily felt greatly varies simultaneously with the release of the connection. In the vehicle steering system 1 according to the present embodiment, however, the reaction force motor 11 is controlled such that the steering reaction force applied to the steering wheel 2 gradually comes closer to the target steering reaction force RT11 at the completion of the release of the connection previously set in the second transition mode. Therefore, a torque variation width TW2 bodily felt before and after the release of the connection is reduced. In FIG. 10, a difference between the steering reaction force RT13 and the steering reaction force RT11' is the torque variation width RW2 bodily felt. This allows the driver to steer the steering wheel 2 without feeling discomfort in a steering feeling even before and after the release of the connection by the connecting member 5.

As described in the foregoing, in the present embodiment, control in the transition mode (the first and second transition modes) is carried out in the transition period from either one of the SBW mode and the EPS mode to the other, so that the steep variation in the steering reaction force with the transition of the mode can be reduced. Therefore, the driver can steer the steering wheel 2 without feeling discomfort in the steering feeling even before and after the transition from either one of the SBW mode and the EPS mode to the other.

Furthermore, the impacts on the inner cable 29, the connecting member 5, and so on, which are applied at the time of the connection by the connecting member 5, can be reduced by reducing the steep variation in the steering reaction force. Therefore, a thinner inner cable 29 and a smaller pulley can be used, as compared with those in the conventional vehicle steering system. This also enables the vehicle steering system 1 to be made lightweight and miniaturized.

Note that either one of the first and second transition modes may be abolished. For example, only the first transition mode may be provided.

Figure 11:
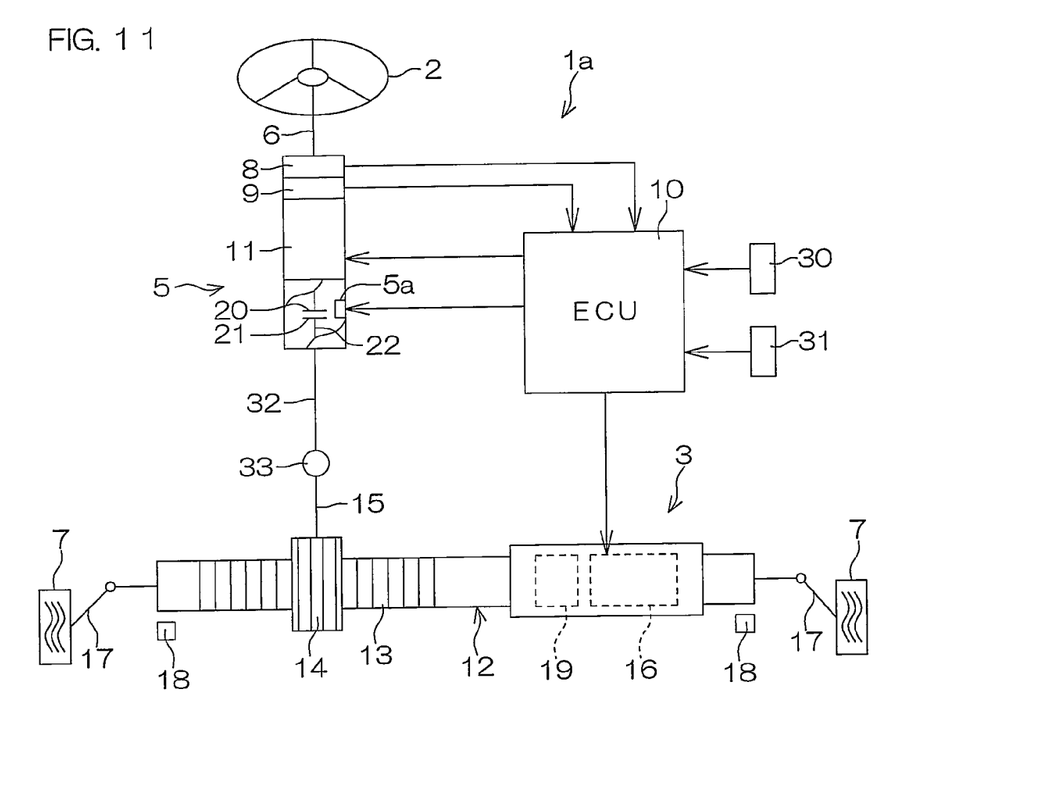
FIG. 11 is a schematic view showing the schematic configuration of a vehicle steering system according to another embodiment of the present invention.

FIG. 11 is a schematic view showing the schematic configuration of a vehicle steering system 1a according to another embodiment of the present invention. In FIG. 11, the same components as those shown in FIGS. 1 and 2, described above, are assigned the same reference numerals as those shown in FIGS. 1 and 2 and hence, the description thereof is not repeated.

Referring to FIG. 11, the vehicle steering system 1a shown in FIG. 11 differs from the vehicle steering system 1 shown in FIG. 1 in that a transmitting shaft 32 is used as a transmitting mechanism.

One end of the transmitting shaft 32 is connected to a second member 21 in a connecting member 5, and the other end thereof is connected to a pinion shaft 15 through a universal joint 33. The transmitting shaft 32 can transmit the rotation of a steering wheel 2 to the pinion shaft 15 with a first member 20 and the second member 21 in the connecting member 5 connected to each other.

According to the present embodiment, a transition mode is executed in a transition period from either one of an SBW mode and an EPS mode to the other, as in the above-mentioned embodiment, so that a steep variation in a steering reaction force with the transition of the mode can be reduced. Furthermore, the transmitting mechanism can be simplified by using the transmitting shaft 32 in place of the transmitting mechanism 4 including the pair of cables 23 shown in FIG. 1.

The present invention is not limited to the contents of the above-mentioned embodiments. Although description was made of a case where the reaction force generated by the reaction force motor 11 is increased in the transition modes shown in FIGS. 5 and 8, for example, the present invention is not limited to the same.

Figure 12:
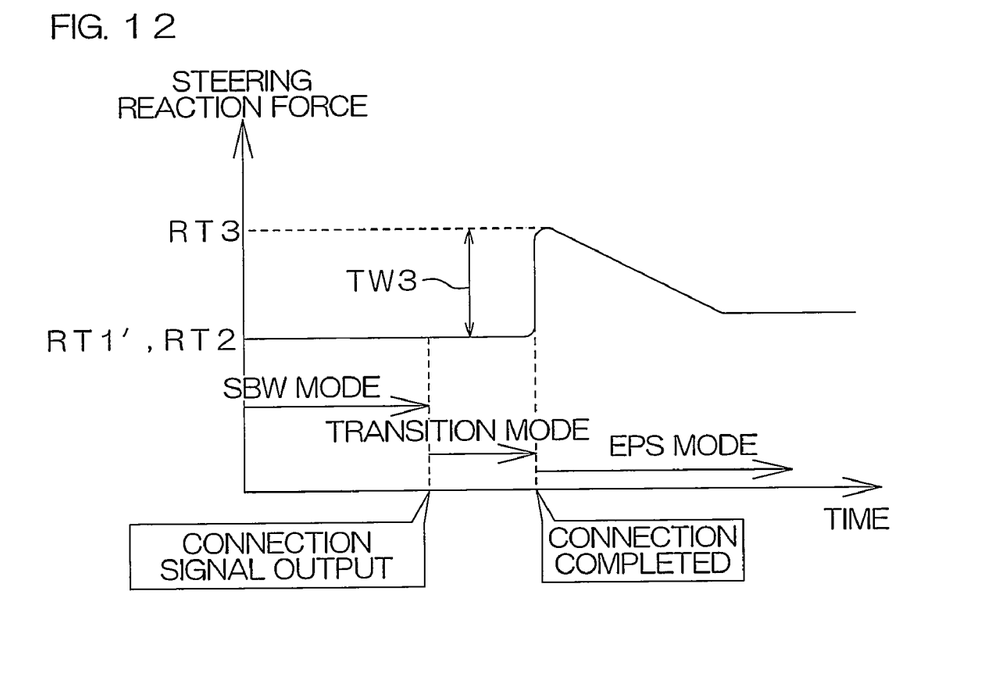
FIG. 12 is a graph showing the values of a steering reaction force in a transition mode and modes before and after the transition mode in still another embodiment of the present invention.

For example, a reaction force generated by the reaction force motor 11 may be kept constant before and after output of a connection signal, as shown in FIG. 12, for example. That is, the reaction force motor 11 is controlled such that the reaction force generated by the reaction force motor 11 is held in a reaction force generated by the reaction force motor 11 before output of a switching signal. A torque variation width TW3 bodily felt in this case is also smaller than the conventional torque variation width TW bodily felt shown in FIG. 14.

Figure 13:
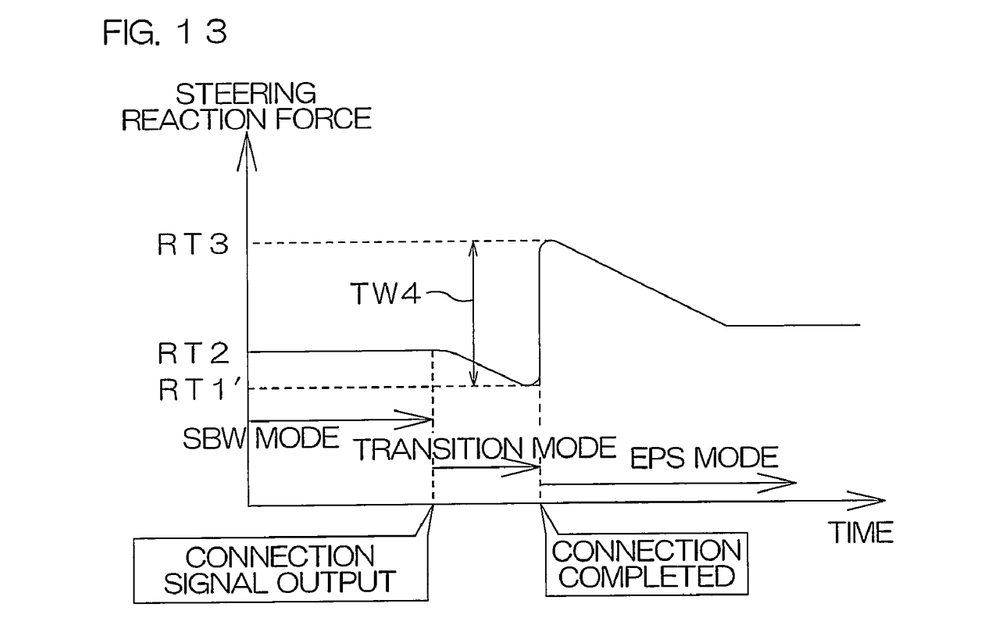
FIG. 13 is a graph showing the values of a steering reaction force in a transition mode and modes before and after the transition mode in a further embodiment of the present invention.

Furthermore, a reaction force generated by the reaction force motor 11 may be reduced after output of a connection signal, as shown in FIG. 13. The reaction force generated by the reaction force motor 11 is set such that a torque variation width TW4 bodily felt in this case is also smaller than the conventional torque variation width TW bodily felt shown in FIG. 14.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The present application corresponds to Application No. 2006-356514 filed with the Japanese Patent Office on Dec. 28, 2006, the disclosure of which is hereinto incorporated by reference.

The invention claimed is:

1. A vehicle steering system comprising:
   a first rotating member connected to a steering member;
   a second rotating member connected to a steering mechanism;
   a switching member that switches between a connected state where the first rotating member and the second rotating member are connected to each other and an unconnected state where the first rotating member and the second rotating member are unconnected to each other;
   a reaction force actuator that applies a steering reaction force to the steering member;
   a steering actuator that drives the steering mechanism in the unconnected state; and
   a control section that controls the steering actuator, the reaction force actuator, and the switching member,
   wherein the control section includes a steer-by-wire mode, a power steering mode, and a first transition mode for transition from the steer-by-wire mode to the power steering mode,
   in the steer-by-wire mode, the control section controls the steering actuator for steering while controlling the reaction force actuator for reaction force in the unconnected state,
   in the power steering mode, steering assist control is carried out with at least one of the steering actuator and the reaction force actuator as an assist unit in the connected state, in the first transition mode, the control section controls the reaction force actuator for reaction force in a transition period from the steer-by-wire mode to the power steering mode, and in the first transition mode, the reaction force actuator is controlled such that a reaction force generated by the reaction force actuator is gradually increased toward a target reaction force upon completion of switching of the switching member previously set or is held in a reaction force generated by the reaction force actuator before output of a switching signal.

2. The vehicle steering system according to claim 1, wherein the control section enters the power steering mode from the steer-by-wire mode through the first transition mode in response to an occurrence of an abnormality in a steered state detecting sensor that detects a steered state or of the steering actuator.

3. The vehicle steering system according to claim 1, wherein the control section includes a second transition mode for transition from the power steering mode to the steer-by-wire mode.

4. The vehicle steering system according to claim 3, wherein in the second transition mode, the reaction force actuator is controlled such that the reaction force generated by the reaction force actuator is gradually decreased toward a target reaction force at a completion of a switching previously set.

5. The vehicle steering system according to claim 4, wherein the control section enters the steer-by-wire mode from the power steering mode through the second transition mode in response to a fact that a difference between a target yaw rate and an actual yaw rate detected by a yaw rate sensor exceeds a predetermined value.

6. The vehicle steering system according to claim 3, wherein the control section enters the steer-by-wire mode from the power steering mode through the second transition mode in response to a fact that a difference between a target yaw rate and an actual yaw rate detected by a yaw rate sensor exceeds a predetermined value.

* * * * *